March 6, 1928.  1,661,996
W. S. CALLERY
TRACTION DEVICE
Filed Feb. 9, 1926
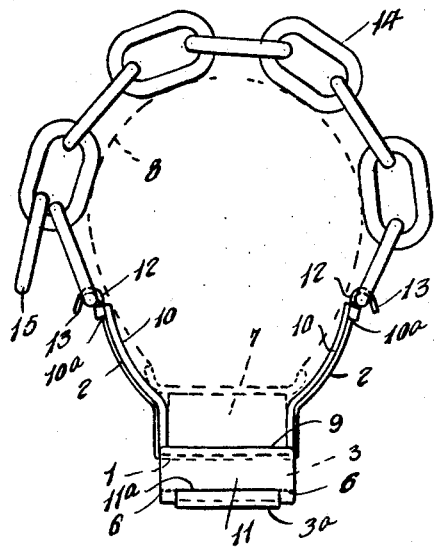
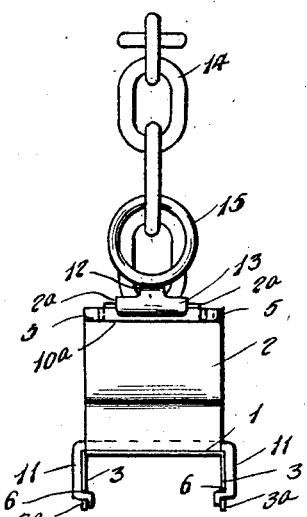
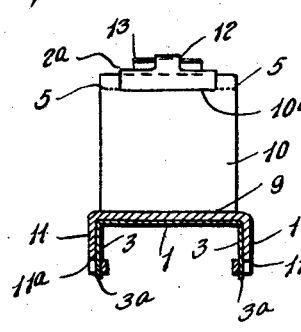
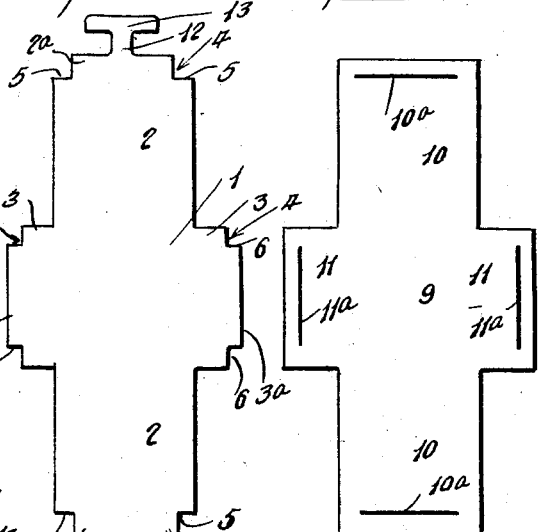
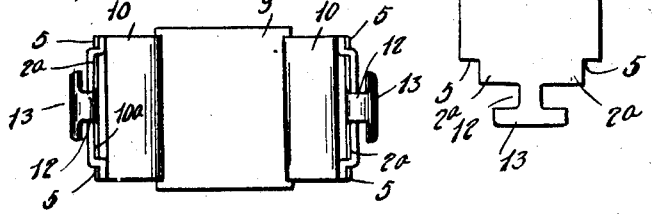
Inventor
W. S. Callery.
By Bryant & Lowry
Attorneys Patented Mar. 6, 1928.

1,661,996

UNITED STATES PATENT OFFICE.

WILLIAM S. CALLERY, OF DIXON, CALIFORNIA.

TRACTION DEVICE.

Application filed February 9, 1926. Serial No. 87,101.

This invention relates to certain new and useful improvements in traction devices and particularly to a traction or anti-skid device adapted for mounting upon a vehicle wheel and has for its primary object to improve the wheel engaging part or clamp of the device that carries the transverse traction device or skid chain overlying the tread of the vehicle wheel.

A further object of the invention is to provide a traction device of the above type wherein the wheel engaging part or clamp is struck from a blank of sheet material and subsequently bent to form felly engaging side walls with chain engaging hooks at the outer ends of the side walls for attachment of the traction or anti-skid chain.

It is a further object of the invention to provide a lining for the wheel engaging portion of the traction device to prevent injury to the engaged part of the vehicle wheel, said lining being attached to the wheel engaging part by an interlocking engagement in the absence of extraneous fastening devices.

With the above and other objects in view that will become apparent as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a front elevational view of a traction device constructed in accordance with the present invention, an automobile wheel being illustrated by dotted lines with the traction device operatively positioned thereon, Figure 2 is a side elevational view of the device, Figure 3 is a vertical cross-sectional view showing the protective lining in position upon the device, Figure 4 is a top plan view, Figure 5 is a developed plan view of the traction device showing the same struck from a sheet metal blank, and Figure 6 is a plan view of the protective lining.

The traction device being preferably struck from sheet metal as illustrated in Fig. 5, the same embodies a central portion 1 rectangular in plan view that carries side extensions 2 forming the side walls of the device, said side walls being of considerable length as illustrated in Fig. 5, while the central portion 1 of the device carries relatively short end extensions 3. The side extensions 2 forming the side walls are bent on parallel lines and in the same direction at their points of connection with the central portion 1 of the blank while the end extensions 3 are similarly bent in the same direction away from the side extensions 2, this arrangement being clearly shown in Figs. 2 and 3.

The extremities of the side and end extensions 2 and 3 are cutaway at their opposite corners as at 4 to form corner shoulders 5 and 6 and tongue extensions $2^a$ and $3^a$.

With the blank forming the traction device folded upon the lines indicated and further illustrated operatively positioned upon a vehicle wheel in Fig. 1, the central portion 1 of the traction device engages the inner face of the wheel felly 7 upon which the wheel tire 8 is supported. To prevent injury to the wheel felly 7, a lining is provided for the traction device and is preferably formed of such material as fabric or leather, the lining being illustrated in Fig. 6 and including the central portion 9 having side extensions 10 and end extensions 11, the outer ends of the extensions being provided with slotted openings $10^a$ and $11^a$ respectively. When the lining is assembled with the traction device the tongue extensions $2^a$ are received in the slotted openings $10^a$ of the lining while the end extensions $3^a$ of the traction device are received in the slotted openings $11^a$ of the lining and the closed end of said slotted portions cooperates with the shoulders 5 and 6 upon the traction device to retain the same in position.

As shown in Fig. 5, each tongue extension $2^a$ upon the traction device carries a T-shaped head embodying a central leg 12 and a cross head 13, the leg 12 being curved with the head 13 directed toward the wheel felly 7 as shown in Fig. 1.

With that part of the traction device disposed upon a wheel felly as illustrated in Fig. 1, the end links of a chain 14 are attached to the cross heads 13, the connection therebetween being accomplished by positioning the major length of the end link in line with the cross head 13 and after positioning the end link inwardly of the cross head in enclosing relations with the leg 12, the link is moved through an arc of ninety degrees and positioned as shown in Figs. 1 and 2 and so retained by the cross head. In order to facilitate the mounting of the traction chain upon the wheel felly engaging part of the device, one of the links adjacent and end link carries a ring 15 which may be employed in moving the adjacent end link by slightly compressing the tire 8 into position for engagement with the adjacent cross head 13.

From the above detail description of the device, it is believed that the construction and operation thereof will at once be apparent, it being noted that the wheel engaging part of the traction device is struck from a single sheet of metal while the lining 9 is interlockingly engaged therewith to the exclusion of extraneous fastening devices to insure the engaged part of the wheel felly against injury of any character, the end links of the cross chain being interlocked with the cross heads 13 while the ring 15 facilitates the positioning of the cross chain 14 in interlocking engagement with the cross heads 13 of the holding device.

While there is herein shown and described the preferred embodiment of the present invention, it is, nevertheless to be understood that minor changes may be made therein without departing from the spirit and scope of the invention as claimed.

What is claimed is:—

1. In a traction device, a traction chain holder formed of a single blank of material, side and end extensions on the blank, a fabric lining having interlocking engagement with the end of said extensions and means to detachably connect a traction chain to the ends of the side extensions.

2. In a traction device, a traction chain holder formed of a single blank of material, side and end extensions on the blank, a fabric lining having interlocking engagement with the end of said extensions, means to detachably connect a traction chain to the ends of the side extensions, the connection between the holder and lining including corner shoulders at the outer ends of the extensions forming tongues and said lining having slotted openings to receive the tongues.

3. In a traction device, a traction chain holder formed of a single blank of material, side and end extensions on the blank, a fabric lining having interlocking engagement with the end of said extensions, and means to detachably connect a traction chain to the ends of the side extensions including T-shaped heads at the outer ends of the side extensions.

4. In a traction device, a traction chain holder formed of a single blank of material, side and end extensions on the blank, a fabric lining having interlocking engagement with the end of said extensions, means to detachably connect a traction chain to the ends of the side extensions, the connection between the holder and lining including corner shoulders at the outer ends of the extensions forming tongues, said lining having slotted openings to receive the tongues, said chain connecting means including T-shaped heads at the outer ends of the side extensions.

In testimony whereof I affix my signature.

WILLIAM S. CALLERY.